United States Patent
Li et al.

(10) Patent No.: US 11,308,952 B2
(45) Date of Patent: Apr. 19, 2022

(54) TEXT AND VOICE INFORMATION PROCESSING METHOD AND TERMINAL

(71) Applicant: Huawei Technologies Co., Ltd., Shenzhen (CN)

(72) Inventors: Xiaojuan Li, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 16/483,688

(22) PCT Filed: May 23, 2017

(86) PCT No.: PCT/CN2017/085451
§ 371 (c)(1),
(2) Date: Aug. 5, 2019

(87) PCT Pub. No.: WO2018/141144
PCT Pub. Date: Aug. 9, 2018

(65) Prior Publication Data
US 2020/0027454 A1    Jan. 23, 2020

(30) Foreign Application Priority Data
Feb. 6, 2017 (CN) .......................... 201710067355.6

(51) Int. Cl.
*G06F 40/20* (2020.01)
*G10L 15/22* (2006.01)
(Continued)

(52) U.S. Cl.
CPC .............. *G10L 15/22* (2013.01); *G06F 3/165* (2013.01); *G06F 40/279* (2020.01); *G06K 9/46* (2013.01);
(Continued)

(58) Field of Classification Search
USPC ............ 358/1.1–3.29, 1.11–1.18; 704/1–10, 704/200–278; 715/200–210, 230–255,
(Continued)

(56) References Cited

U.S. PATENT DOCUMENTS 5,999,660 A    12/1999  Zorin et al.
6,636,238 B1   10/2003  Amir et al.
(Continued)

FOREIGN PATENT DOCUMENTS

CN    101706807 A    5/2010
CN    101765840 A    6/2010
(Continued)

OTHER PUBLICATIONS

Machine Translation and Abstract of Chinese Publication No. CN102270241, Dec. 7, 2011, 15 pages.
(Continued)

*Primary Examiner* — Marcellus J Augustin
(74) *Attorney, Agent, or Firm* — Conley Rose, P.C.

(57) ABSTRACT

A text and voice information processing method includes: photographing a document to obtain a first picture, wherein the document comprises a first text keyword and a second text keyword; recording audio to obtain a voice file corresponding to the document; obtaining a first voice segment matching the first text keyword and a second voice segment matching the second text keyword from the voice file; displaying a second picture with a first play button and a second play button; in response to a user input, playing back the first voice segment or playing back the second voice segment.

20 Claims, 5 Drawing Sheets

(51) Int. Cl.
*G06F 40/279* (2020.01)
*G06F 3/16* (2006.01)
*G06K 9/46* (2006.01)
*G10L 15/08* (2006.01)
*G06F 3/0481* (2022.01)

(52) U.S. Cl.
CPC ............ *G10L 15/08* (2013.01); *G06F 3/0481* (2013.01); *G06K 2209/01* (2013.01); *G10L 2015/088* (2013.01); *G10L 2015/223* (2013.01)

(58) Field of Classification Search
USPC ................................................ 715/727–730
See application file for complete search history.

(56) References Cited

U.S. PATENT DOCUMENTS

| | | | |
|---|---|---|---|
| 9,900,632 B1* | 2/2018 | Flores Guerra | .... H04N 21/4884 |
| 2005/0235216 A1 | 10/2005 | Kawano | |
| 2010/0278453 A1 | 11/2010 | King | |
| 2011/0267490 A1* | 11/2011 | Goktekin | ........... H04N 1/00307 348/222.1 |
| 2012/0315013 A1 | 12/2012 | Wing et al. | |
| 2014/0168716 A1* | 6/2014 | King | ..................... G06Q 10/10 358/473 |
| 2015/0012270 A1* | 1/2015 | Reynolds | ............... G11B 27/19 704/233 |
| 2017/0060531 A1* | 3/2017 | Abbo | ..................... G10L 15/26 |

FOREIGN PATENT DOCUMENTS

| | | | | |
|---|---|---|---|---|
| CN | 102270241 A | | 12/2011 | |
| CN | 102932623 A | | 2/2013 | |
| CN | 103207860 A | | 7/2013 | |
| CN | 103346955 A | | 10/2013 | |
| CN | 103888654 A | | 6/2014 | |
| CN | 106202204 | * | 12/2016 | ............. G06F 17/30 |
| KR | 101590078 B1 | * | 2/2016 | ............. G06F 17/30 |

OTHER PUBLICATIONS

Machine Translation and Abstract of Chinese Publication No. CN103346955, Oct. 9, 2013, 16 pages.
Foreign Communication From A Counterpart Application, Chinese Application No. 201780005101.X, Chinese Office Action dated Dec. 18, 2019, 7 pages.
Machine Translation and Abstract of Chinese Publication No. CN101706807, May 12, 2010, 13 pages.
Machine Translation and Abstract of Chinese Publication No. CN103207860, Jul. 17, 2013, 17 pages.
Machine Translation and Abstract of Chinese Publication No. CN103888654, Jun. 25, 2014, 15 pages.
Foreign Communication From A Counterpart Application, PCT Application No. PCT/CN2017/085451, English Translation of International Search Report dated Nov. 8, 2017, 2 pages.
Foreign Communication From A Counterpart Application, PCT Application No. PCT/CN2017/085451, English Translation of Written Opinion dated Nov. 8, 2017, 5 pages.

* cited by examiner

Before calibration / After calibration

TEXT AND VOICE INFORMATION PROCESSING METHOD AND TERMINAL

CROSS-REFERENCE TO RELATED APPLICATIONS

This application is a National Stage of International Application No. PCT/CN2017/085451, filed on May 23, 2017, which claims priority to Chinese Patent Application No. 201710067355.6, filed on Feb. 6, 2017, both of which are hereby incorporated by reference in their entireties.

TECHNICAL FIELD

This application relates to the communications field, and in particular, to a text and voice information processing method and a terminal.

BACKGROUND

At present, in many conference occasions, a participant usually needs to shoot a PowerPoint (power point, PPT) document for presentation to better record meeting content, and also records a presentation, on PPT content, given by a speaker to record meeting information more completely.

In the prior art, meeting content is recorded in a manner of shooting voiced photos, that is, by shooting a PPT and recording ambient sounds or adding voice tags to the photos that are generated through shooting.

However, in the prior art, given-duration audio can be recorded only after the PPT is shot. As a result, this may cause missing of useful meeting information and cannot implement synchronization between the PPT and the audio.

SUMMARY

Embodiments of this application provide a text and voice information processing method and a terminal, in order to mitigate a prior-art problem of asynchronization between text content and voice content.

A first aspect of the embodiments of this application provides a text and voice information processing method, including: recognizing text information in an obtained target picture, where a manner of obtaining the target picture may be shooting a document to generate the target picture, or receiving the target picture sent by another terminal; after recognizing the text information, extracting first key information of the text information, where the first key information includes a text keyword set and word frequency corresponding to each text keyword, and the text keyword is a keyword extracted from the text information according to a predefined rule, for example, a noun is extracted; obtaining a voice file corresponding to the text information, where the voice file may also be obtained in a plurality of manners, which may be performing a recording operation to obtain the voice file, or receiving the voice file sent by another terminal; and if the word frequency corresponding to the text keyword is greater than a threshold and the threshold is a preset value, mapping the voice file to a first preset coordinate position, where the first preset coordinate position is included in the target picture. In this embodiment of the present invention, the text information in the target picture is recognized, the voice file corresponding to the text information is obtained, and the voice file is mapped to the first preset coordinate position. Therefore, a prior-art problem of asynchronization between text content and voice content is mitigated.

In a possible design, in a first implementation of the first aspect of the embodiments of this application, if the word frequency corresponding to the text keyword is not greater than the threshold, second key information of the voice file is extracted, where the second key information includes a voice keyword set and a voice segment corresponding to each voice keyword, and the extracted second key information is saved. If a first voice keyword matching the text keyword exists in the voice keyword set, a voice segment corresponding to the first voice keyword is mapped to a coordinate position of the text keyword in the target picture. In this embodiment of this application, a processing method used when the word frequency corresponding to the text keyword is not greater than the threshold is added, and therefore an implementation is added for this embodiment of this application.

In a possible design, in a second implementation of the first aspect of the embodiments of this application, after the extracting and saving second key information of the voice file, the method further includes: if a keyword matching a second voice keyword does not exist in the text keyword set, mapping, to a second preset coordinate position in the target picture, a second voice segment corresponding to the second voice keyword, where the second voice keyword is a keyword in the voice keyword set. In this embodiment of this application, a case in which a matched keyword does not exist in the text keyword set is added, and therefore an implementation is added for this embodiment of this application.

In a possible design, in a third implementation of the first aspect of the embodiments of this application, the recognizing a target picture to obtain text information of a document includes: calibrating the target picture; and recognizing the calibrated target picture to obtain the text information. In this embodiment of this application, a process of extracting the first key information is refined, thereby increasing feasibility and operability of this embodiment of this application.

In a possible design, in a fourth implementation of the first aspect of the embodiments of this application, after the mapping the voice file to a first preset coordinate position in the target picture, the method further includes: generating and saving the target picture, where the target picture displays a play button, and the play button is used to play back the voice file. In this embodiment of this application, a step of saving a calibrated picture of a document is added, to make the steps in this embodiment of this application more complete.

In a possible design, in a fifth implementation of the first aspect of the embodiments of this application, after the generating and saving the target picture, the method further includes: receiving a click operation on the play button, and responding to the click operation to play back the voice file. In this embodiment of this application, a process of receiving a user click operation and playing back the voice file is added, to make the steps in this embodiment of this application more complete.

In a possible design, in a sixth implementation of the first aspect of the embodiments of this application, before the mapping the voice file to a first preset coordinate position in the target picture and after the recognizing a target picture to obtain text information, the method further includes: obtaining a coordinate position of the text keyword in the target picture. In this embodiment of this application, a step of obtaining the coordinate position of the text keyword in the target picture is provided, to make this embodiment of this application more logical.

In a possible design, in a seventh implementation of the first aspect of the embodiments of this application, the text keyword set includes one or more text keywords. In this embodiment of this application, a limitation is imposed on the text keyword set, to make the steps in this embodiment of this application more complete.

A second aspect of the embodiments of this application provides a terminal, including: a recognition unit, configured to recognize text information in a target picture; a first extraction unit, configured to extract first key information of the text information, where the first key information includes a text keyword set and word frequency corresponding to each text keyword, a first obtaining unit, configured to obtain a voice file corresponding to the text information, and a first mapping unit, configured to map the voice file to a first preset coordinate position in the target picture if the word frequency corresponding to the text keyword is greater than a threshold. In this embodiment of the present invention, the text information in the target picture is recognized, the voice file corresponding to the text information is obtained, and the voice file is mapped to the first preset coordinate position. Therefore, a prior-art problem of asynchronization between text content and voice content is mitigated.

In a possible design, in a first implementation of the second aspect of the embodiments of this application, the terminal further includes: a second extraction unit, configured to, if the word frequency corresponding to the text keyword is not greater than the threshold, extract and save second key information of the voice file, where the second key information includes a voice keyword set and a voice segment corresponding to each voice keyword; and a second mapping unit, configured to, if a first voice keyword matching the text keyword exists in the voice keyword set, map, to a coordinate position of the text keyword in the target picture, a first voice segment corresponding to the first voice keyword in this embodiment of this application, a processing method used when the word frequency corresponding to the text keyword is not greater than the threshold is added, and therefore an implementation is added for this embodiment of this application.

In a possible design, in a second implementation of the second aspect of the embodiments of this application, the terminal further includes: a third mapping unit, configured to, if a keyword matching a second voice keyword does not exist in the text keyword set, map, to a second preset coordinate position in the target picture, a second voice segment corresponding to the second voice keyword, where the second voice keyword is included in the voice keyword set. In this embodiment of this application, a case in which a matched keyword does not exist in the text keyword set is added, and therefore an implementation is added for this embodiment of this application.

In a possible design, in a third implementation of the second aspect of the embodiments of this application, the recognition unit includes: a calibration module, configured to calibrate the target picture; and a recognition module, configured to recognize the target picture to obtain the text information. In this embodiment of this application, a process of extracting the first key information is refined, thereby increasing feasibility and operability of this embodiment of this application.

In a possible design, in a fourth implementation of the second aspect of the embodiments of this application, the terminal further includes: a generation unit, configured to generate and save the target picture, where the target picture displays a play button, and the play button is used to play back the voice file. In this embodiment of this application, a step of saving a calibrated picture of a document is added, to make the steps in this embodiment of this application more complete.

In a possible design, in a fifth implementation of the second aspect of the embodiments of this application, the terminal further includes: a receiving unit, configured to receive a click operation on the play button, to play back the voice file. In this embodiment of this application, a process of receiving a user click operation and playing back the voice file is added, to make the steps in this embodiment of this application more complete In a possible design, in a sixth implementation of the second aspect of embodiments of this application, the terminal further includes: a second obtaining unit, configured to obtain a coordinate position of the text keyword in the target picture. In this embodiment of this application, a step of obtaining the coordinate position of the text keyword in a document is provided, to make this embodiment of this application more logical.

In a possible design, in a seventh implementation of the second aspect of the embodiments of this application, the text keyword set includes at least one text keyword. In this embodiment of this application, a limitation is imposed on the text keyword set, to make the steps in this embodiment of this application more complete.

A third aspect of the embodiments of this application provides a computer readable storage medium, where the computer readable storage medium stores an instruction, and when the instruction runs on a computer, the computer performs the methods described in the foregoing aspects.

A fourth aspect of the embodiments of this application provides a computer program product including an instruction, where when the instruction runs on a computer, the computer performs the methods described in the foregoing aspects.

DESCRIPTION OF EMBODIMENTS

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
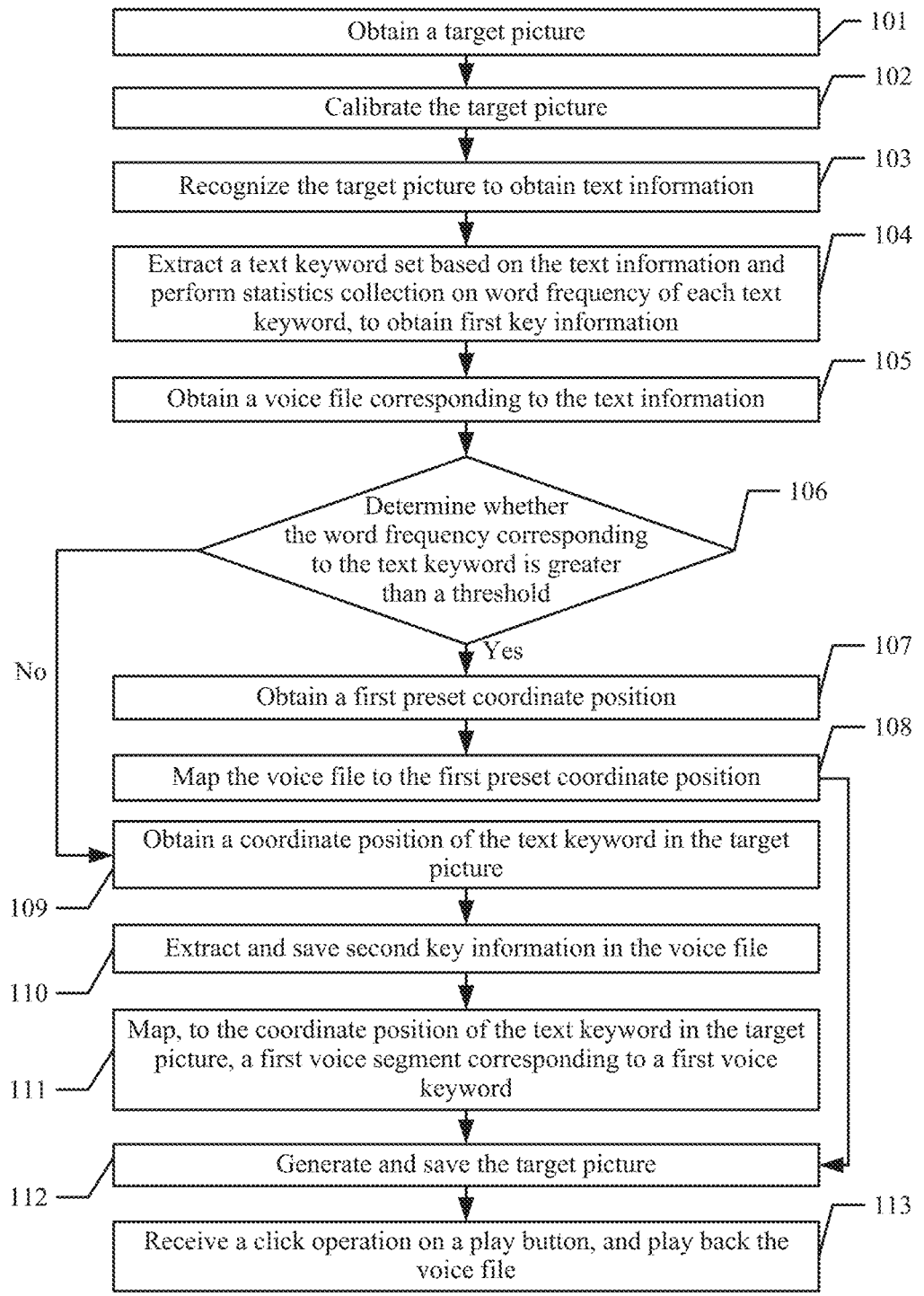
FIG. 1 is a schematic diagram of an embodiment of a possible text and voice information processing method according to embodiments of this application.

A text and voice information processing method is provided in an embodiment of this application, in order to mitigate a prior-art problem of asynchronization between text content and voice content Referring to FIG. 1, an embodiment of the text and voice information processing method according to this embodiment of this application is introduced.

101: Obtain a target picture.

In a particular occasion, for example, in a conference, to better record meeting content, a user usually needs to shoot a document by using a terminal to obtain the target picture. It should be noted that in an actual application, the document shot by the user by using the terminal may be a PPT, a Word, a conference material book, or the like. The target picture is obtained by the terminal in a plurality of manners, which may also be receiving the target picture sent by another terminal, in addition to shooting the document to obtain the target picture by the terminal. A manner of obtaining the target picture by the terminal is not specifically limited herein.

In addition, the terminal in this embodiment of this application may be a communications terminal, or an Internet access terminal, for example, may be a PDA, a mobile internet device (mobile internet device, MID), a tablet computer, or a mobile phone. This is not specifically limited herein.

102: Calibrate the target picture.

Figure 2:
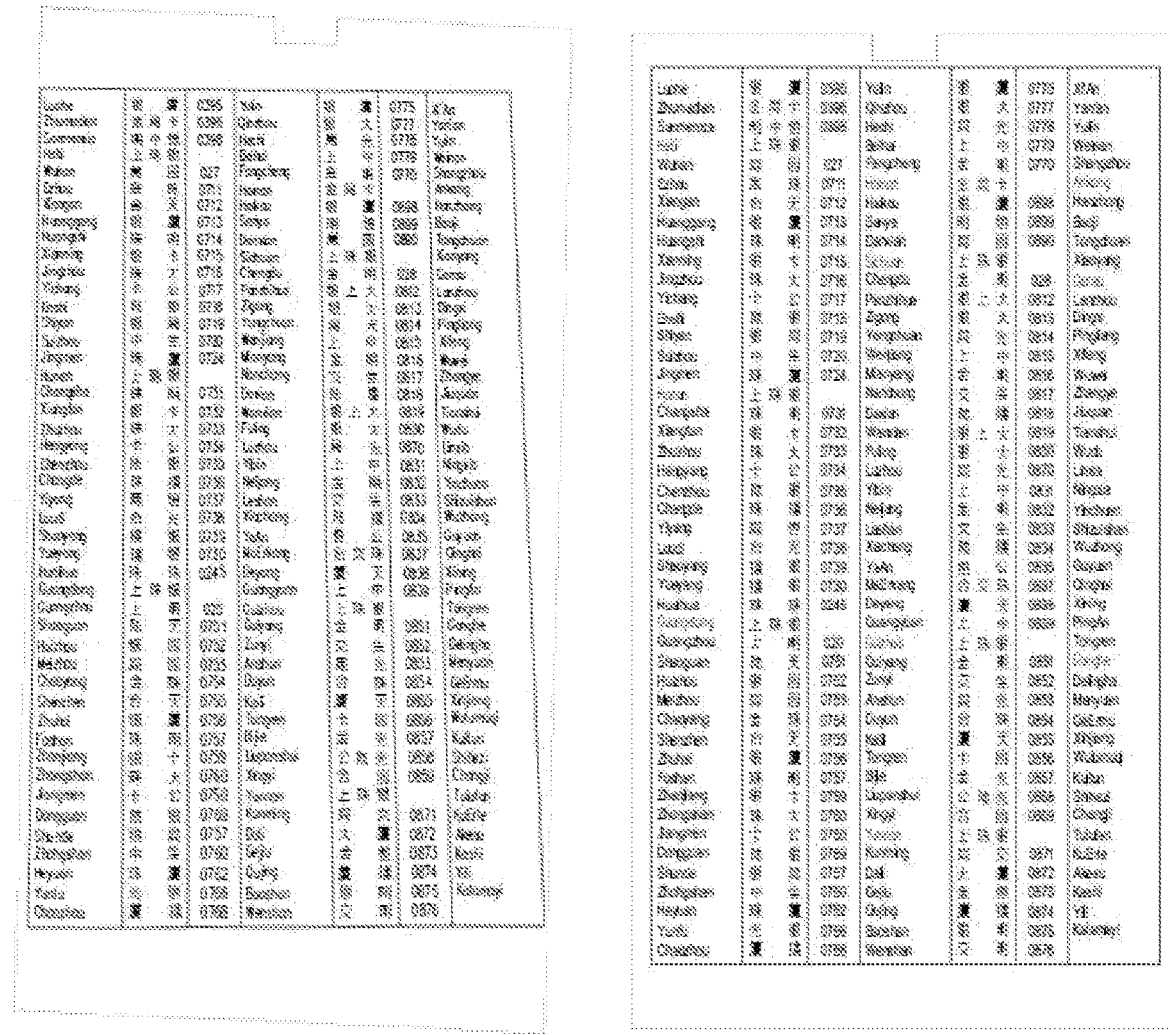
FIG. 2 is a schematic diagram of comparison of a possible text and voice information processing method according to an embodiment of this application.

In an actual case, the user may shoot the document from different angles by using the terminal, and a document image displayed on the target picture obtained by shooting may possibly appear angularly distorted, affecting a recognition rate of text information in the document. Therefore, after obtaining the target picture, the terminal performs calibration processing on the target picture, so as to calibrate an angularly distorted document image obtained at a poor shooting angle, improve precision of recognizing words in the document. The document image is included in the target picture. For example, FIG. 2 shows a comparison diagram of a picture before calibration and after calibration. Before calibration, a document displayed on the picture is distorted. After calibration processing is performed, a part other than the document is removed, and the document displayed on the picture is calibrated to a rectangle, so as to facilitate text information recognition of the terminal and document viewing of the user.

A process of calibrating the target picture may be divided into three stages, including: (1) pre-processing, (2) tilt angle detection, and (3) document calibration. A purpose of the pre-processing is to obtain an approximate layout of content on the image; a purpose of the tilt angle detection is to obtain a document tilt angle; and a document calibration stage is to rotate and calibrate the image by a detected tilt angle. For a calibrated image, a horizontal text line is consistent with a horizontal line. Because picture calibration belongs to the prior art that is already existing, details are not described herein.

It should be noted that when calibrating the target picture, the terminal may automatically detect the text information, to perform calibration. Alternatively, the terminal may receive a selection instruction sent by the user, where the selection instruction is used to indicate a user-defined calibration range of the target picture to the terminal, and then the terminal performs calibration based on the range. This is not specifically limited herein.

103: Recognize the target picture to obtain text information.

After the terminal calibrates the target picture, the terminal recognizes the target picture to obtain the text information in the target picture, that is, coverts the text information in the target picture into editable text information.

Specifically, the target picture is scanned for text information. When it is determined that the target picture includes the text information, the text information is extracted. The text information in this embodiment of this application may be information such as text or a symbol. Whether the target picture includes the text information is determined in a plurality of manners, which may be obtaining a text feature of the text information and determining whether text corresponding to the text feature exists in a database, so as to determine whether the target picture includes the text information.

Optionally, feature extraction may be performed on the text information of the target picture. Corresponding text information may be extracted based on preset feature information in a corresponding database, so as to make the text information in an editable state.

A manner of extracting the text information from the document may be a character recognition manner, for example, optical character recognition (optical character recognition, OCR). The text information may be scanned and pre-processed, for example, being binarized, denoised, and tilt-calibrated. The text information may be segmented into characters through character segmentation, to increase character recognition efficiency.

104: Extract a text keyword set based on the text information and perform statistics collection on word frequency of each text keyword, to obtain first key information.

After obtaining the text information of the document, the terminal may split each sentence in the text information into different text keywords through a natural language processing operation, to obtain the text keyword set, and perform statistics collection on the word frequency corresponding to each text keyword, where the word frequency is a quantity of occurrence times of each text keyword in the document. In this way, the terminal obtains the first key information, and the first key information includes the text keyword set and the word frequency corresponding to each text keyword. In addition, the text keyword may be a Chinese phrase, an English word, or the like. In a text keyword extraction process, with reference to a context, at least two text keywords with similar semantic meanings may be used as one word. For example, "Apple iPhone" and "IPHONE" are text keywords. It is assumed that word frequency of the "Apple iPhone" is 13, and word frequency of the "IPHONE" is 5. During statistics collection of the word frequency, these two may be used as one word. That is, the word frequency of "Apple iPhone" or "IPHONE" is 18. In an actual application, text keywords with similar semantic meanings may be used as different words for statistics collection. This is not specifically limited herein.

105: Obtain a voice file corresponding to the text information.

When attending a conference, to better record meeting content, the user may not only obtain the target picture by using the terminal, but also obtain the voice file corresponding to the text information in the target picture. The voice file is in one-to-one correspondence with the text information. For example, description information, a context, or a title in the text information is associated with the voice file. The voice file corresponding to the text information is obtained in a plurality of manners. For example, When a speaker presents a document in a meeting, the user may record audio by using the terminal to obtain a corresponding voice file. Alternatively, the terminal may receive a corresponding voice file sent by another terminal. It should be noted that duration of the voice file may be 30 minutes or one hour. This is not specifically limited herein.

It should be noted that in this embodiment of this application, the terminal obtains the corresponding voice file in step 105, and obtains the target picture in step 101. There is no sequential order between the two steps. Step 101 may be performed first, or step 105 may be performed first, or the two steps are performed simultaneously. This is not specifically limited herein.

106: Determine whether the word frequency corresponding to the text key word is greater than a threshold; and if yes, perform step 107, or if not, perform step 109.

After obtaining the first key information, the terminal determines whether the word frequency corresponding to each text keyword is greater than a threshold. If the word frequency corresponding to each text keyword is greater than the threshold, step 107 is performed; if the word frequency corresponding to each text keyword is not greater than the threshold, step 109 is performed. The text keyword may be one or more keywords.

107: Obtain a first preset coordinate position.

After the terminal calibrates the target picture, the terminal may preset a two-dimensional coordinate system on the calibrated target picture. Each part of the target picture has a coordinate point or a coordinate range in the two-dimensional coordinate system, so that the terminal can obtain the first preset coordinate position. The first preset coordinate position may be a coordinate position of a text keyword with corresponding word frequency greater than the threshold in the target picture, or may be a preset position in the target picture, for example, a blank area in the target picture. This is not specifically limited herein.

108: Map the voice file to the first preset coordinate position.

When the word frequency of the text keyword is greater than the threshold, the terminal maps the obtained voice file to the first preset coordinate position. It should be noted that there may be one or more keywords whose corresponding word frequency is greater than the threshold. When the first preset coordinate position is a coordinate position of the text keyword in the target picture, there may be one or more corresponding first preset coordinate positions. When the first preset coordinate position is the preset position in the target picture, there may be one first preset coordinate position. This is not specifically limited herein.

109: Obtain a coordinate position of the text keyword in the target picture.

When the word frequency corresponding to the text keyword is not greater than the threshold, the terminal obtains the coordinate position of the text keyword in the target picture. In addition, in this embodiment of this application, a manner of obtaining the coordinate position of the text keyword in the target picture by the terminal in step 109 is similar to a manner of obtaining the first preset coordinate position by the terminal in step 107. Details are not described herein.

110: Extract and save second key information in the voice file.

The terminal splits the obtained voice file into a plurality of voice segments, where each voice segment is corresponding to a voice keyword, so that the terminal obtains the second key information. The second key information includes a voice keyword set and a voice segment corresponding to each voice keyword. For example, the terminal may extract, from voice breaks in the voice file, a predefined-type audio segment between two adjacent breaks, extract a voice keyword from each audio segment, and integrate audio segments corresponding to each extracted voice keyword to obtain the voice segment corresponding to each voice keyword.

111: Map, to the coordinate position of the text keyword in the target picture, a first voice segment corresponding to a first voice keyword.

In this application, based on such understanding, because the text information is corresponding to the voice file, and a voice keyword in the voice file reflects content of the text information and is very likely to be present in the text information, a text keyword in the text information is very likely to be present in the voice keyword set. Therefore, after the terminal obtains the second key information, if the first voice keyword that matches a text keyword whose corresponding word frequency is less than the threshold exists in the voice keyword set of the second key information, the first voice segment corresponding to the first voice keyword is mapped to the coordinate position of the text keyword in the target picture. It should be noted that in an actual application, determining whether a voice keyword matches a text keyword may be determining whether the voice keyword and the text keyword are a same word or have similar semantic meanings, for example, "photo" and "picture"; or whether the voice keyword and the text keyword are in an inclusion relationship, that is, whether the voice keyword includes the text keyword, or the text keyword includes the voice keyword. For example, if the text keyword is "12MP Photo" and the voice keyword is "Photo", the terminal may determine that the two keywords match. Therefore, a keyword matching rule is not specifically limited herein.

In addition, if a second voice keyword exists in the voice keyword set, and no keyword in the text keyword set matches the second voice keyword, the terminal maps a voice segment corresponding to the second voice keyword to a second preset coordinate position in the document.

112: Generate and save the target picture.

After the terminal maps the voice file to the first preset coordinate position and/or maps the first voice segment to the coordinate position of the text keyword in the document, the terminal generates and locally saves the target picture. It can be understood that, in this embodiment of this application, a format of the target picture generated and saved by the terminal in step 112 and a format of the target picture obtained by the terminal in step 101 may be the same, or may be different, in other words, the terminal may convert a format of the target picture when generating the target picture. This is not specifically limited herein. In addition, the target picture may be saved in a format of bmp, gif, jpg, or the like. This is not specifically limited herein.

Figure 3:
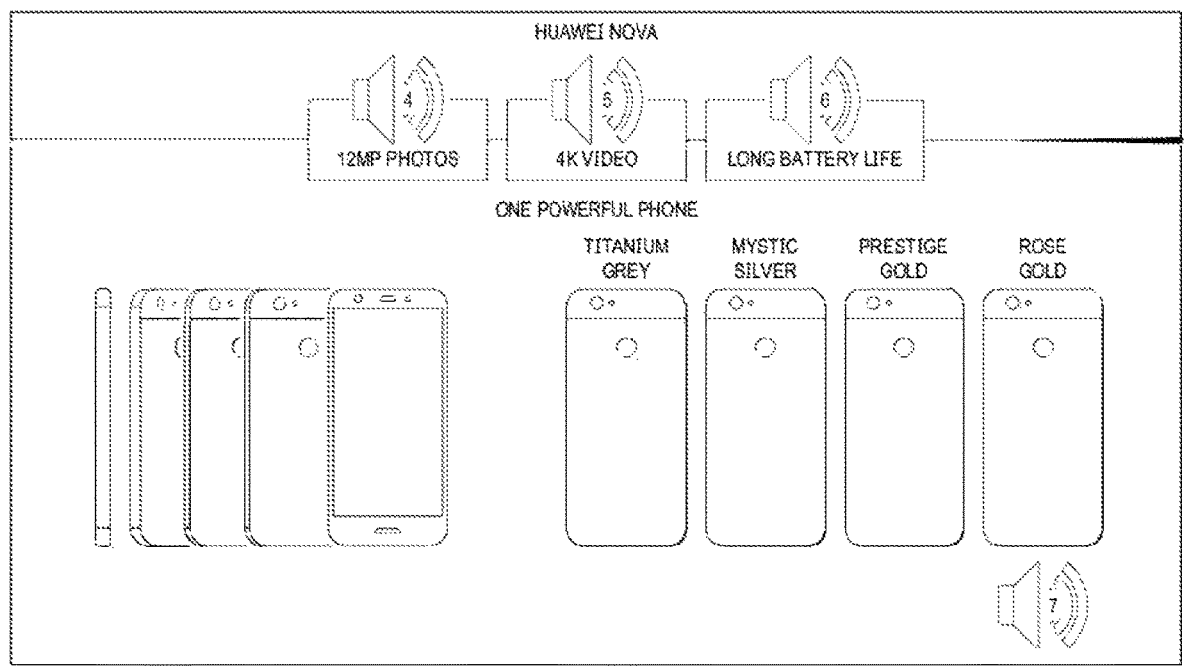
FIG. 3 is a diagram of a display screen of a possible text and voice information processing method according to an embodiment of this application.

The target picture may include a play button, and the play button may be used to play back a corresponding voice file. That is, when the word frequency of the text keyword is greater than the threshold, the play button is provided at the first preset position to play back the voice file; when the word frequency corresponding to the text keyword is not greater than the threshold, the play button is provided at the coordinate position of the text keyword in the target picture to play back the first voice segment. As shown in FIG. 3, there is a play button correspondingly at each text keyword in the document. The play button may be in a horn shape or an ear shape, for example, " ". When the play button is clicked, the play button may change from a static state to a dynamic state, to indicate to the user that the corresponding voice file or the first voice segment is being played back. There is a specific play button in a lower-right corner of a picture shown in FIG. 3. A coordinate position corresponding to the specific play button may be the first preset coordinate position or the second preset coordinate position. That is, when the specific play button is clicked, the terminal plays back the obtained voice file or the second voice segment corresponding to the second voice keyword.

113: Receive a click operation on a play button, and play back the voice tile.

After the terminal generates the target picture, the terminal receives the click operation that the user performs on the play button in the target picture, responds to the click operation, and plays back a voice segment corresponding to the play button. The voice segment may be the voice file obtained by the terminal or a voice segment corresponding to a voice keyword.

In this embodiment of this application, a prior-art problem of asynchronization between text content and voice content can be mitigated. This is good for subsequent browsing and arrangement by the user, in addition, corresponding voice information may be mapped based on the text keyword in the text information, thereby consuming less power and saving storage space.

Figure 4:
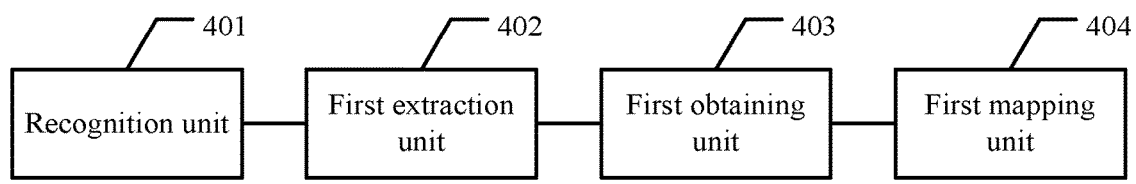
FIG. 4 is a schematic diagram of an embodiment of a terminal according to the embodiments of this application.

The foregoing describes the text and voice information processing method in the embodiments of this application. The following describes a terminal in the embodiments of this application. Referring to FIG. 4, an embodiment of the terminal in the embodiments of this application includes:

a recognition unit 401, configured to recognize text information in a target picture;

a first extraction unit 402, configured to extract first key information of the text information, where the first key information includes a text keyword set and word frequency corresponding to each text keyword;

a first obtaining unit 403, configured to obtain a voice file corresponding to the text information; and a first mapping unit 404, configured to map the voice file to a first preset coordinate position in the target picture if the word frequency corresponding to the text keyword is greater than a threshold.

Figure 5:
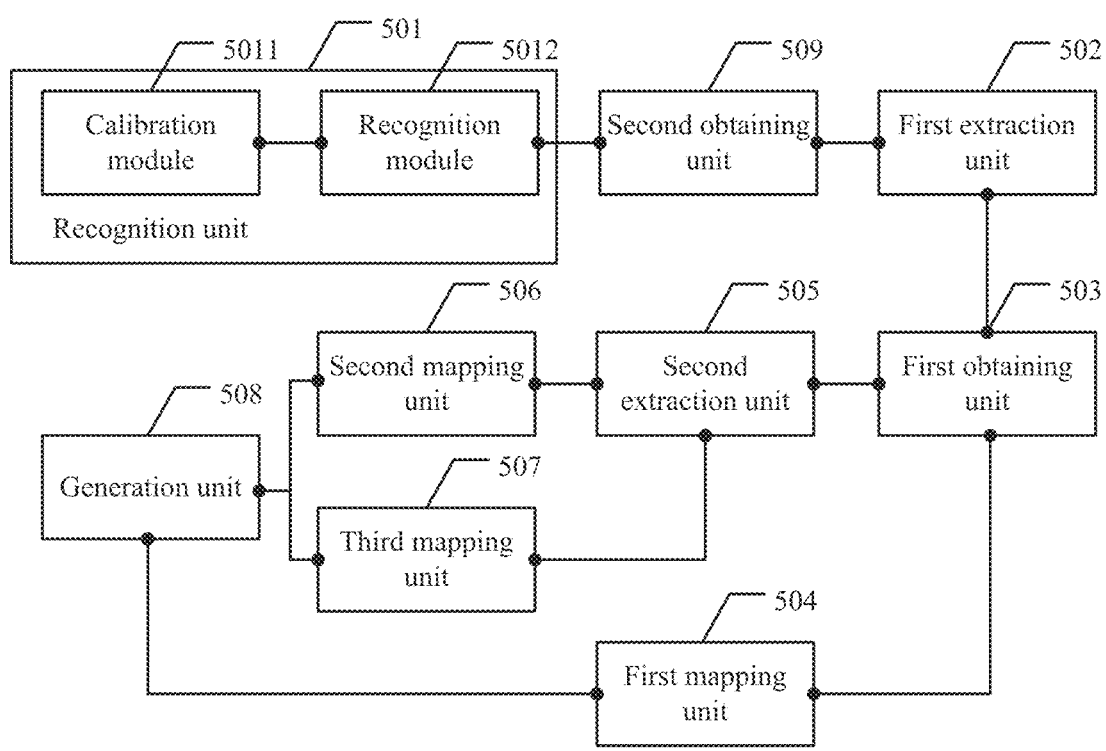
FIG. 5 is a schematic diagram of an embodiment of another terminal according to the embodiments of this application.

For ease of understanding, the following describes in detail the terminal in the embodiments of this application. On a basis of the foregoing FIG. 4, referring to FIG. 5, FIG. 5 is a schematic diagram of another embodiment of the terminal in the embodiments of this application, and the terminal further includes:

a second extraction unit 505, configured to, if the word frequency corresponding to the text keyword is not greater than the threshold, extract and save second key information of the voice file, where the second key information includes a voice keyword set and a voice segment corresponding to each voice keyword; and a second mapping unit 506, configured to, if a first voice keyword matching the text keyword exists in the voice keyword set, map, to a coordinate position of the text keyword in the target picture, a first voice segment corresponding to the first voice keyword.

Optionally, in another embodiment of the terminal in the embodiments of this application, the terminal may further include:

a third mapping unit 507, configured to: if a keyword matching a second voice keyword does not exist in the text keyword set, map, to a second preset coordinate position in the target picture, a second voice segment corresponding to the second voice keyword, where the second voice keyword is included in the voice keyword set.

Optionally, in another embodiment of the terminal in the embodiments of this application, a recognition unit 501 may include:

a calibration module 5011, configured to calibrate the target picture; and a recognition module 5012, configured to recognize the target picture to obtain the text information.

Optionally, in another embodiment of the terminal in the embodiments of this application, the terminal may further include:

a generation unit 508, configured to generate and save the target picture, where the target picture displays a play button, and the play button is used to play back the voice file.

Optionally, in another embodiment of the terminal in the embodiments of this application, the terminal may further include:

a second obtaining unit 509, configured to obtain a coordinate position of the text keyword in the target picture.

Figure 6:
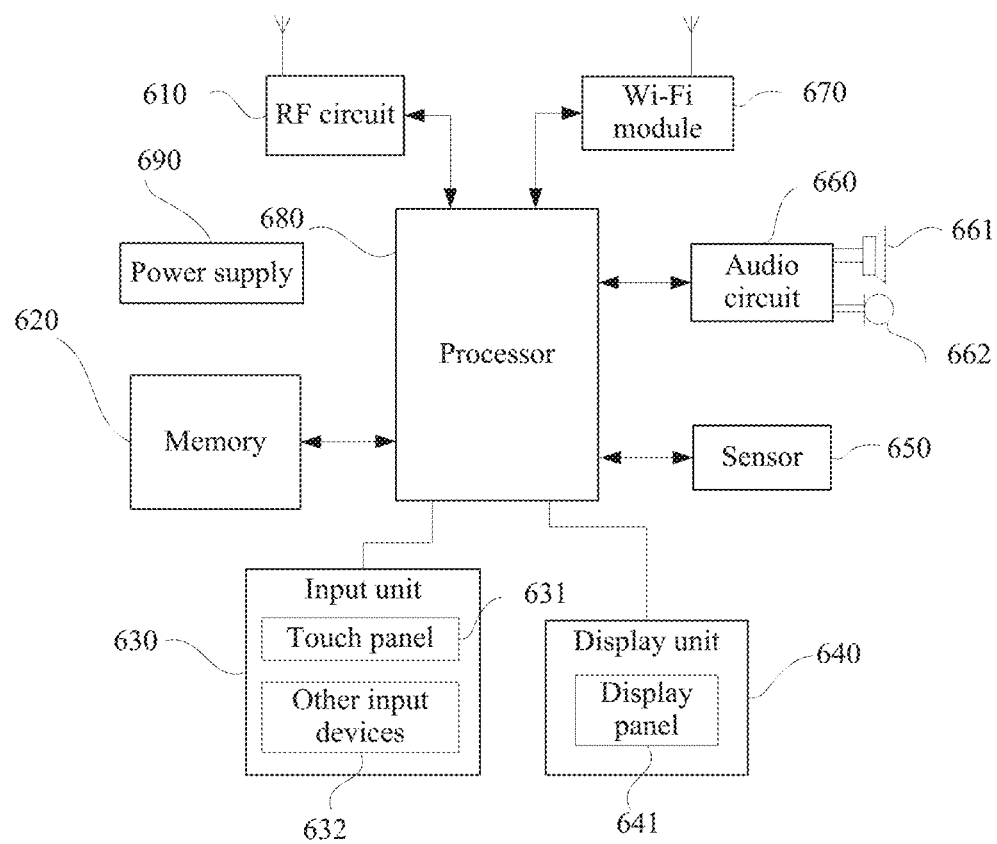
FIG. 6 is a schematic diagram of an embodiment of another terminal according to the embodiments of this application.

FIG. 4 and FIG. 5 describe the terminal in the embodiments of this application from a perspective of a modular function entity, and the following describes the terminal in the embodiments of this application from a perspective of hardware processing. Referring to FIG. 6, a terminal according to an embodiment of this application includes:

a processor 680 and a touchscreen, where in an actual application, the touchscreen may further specifically include a touch panel 631 and a display panel 641. For ease of description, only a part related to this embodiment of this application is shown in FIG. 6. For specific technical details not disclosed, refer to the method part in the embodiments of this application. The terminal may be any terminal device such as a mobile phone, a tablet computer, or a personal digital assistant (personal digital assistant, PDA).

Referring to FIG. 6, the terminal includes components such as a radio frequency (radio frequency, RF) circuit 610, a memory 620, an input unit 630, a display unit 640, a sensor 650, an audio circuit 660, a Wireless Fidelity (wireless fidelity, WiFi) module 670, a processor 680, and a power supply 690. A person skilled in the art can understand that a structure of the terminal shown in FIG. 6 does not constitute any limitation on the terminal, and the terminal may include more or fewer components than those shown in the figure, or a combination of some components, or the components disposed differently.

The following specifically describes each composition component of the terminal with reference to FIG. 6.

The RF circuit 610 may be configured to: receive and send a signal in an information receiving and sending process or a call process. In particular, after receiving downlink information of a base station, the RF circuit 610 sends the downlink information to the processor 680 for processing. In addition, the RF circuit 610 sends related uplink data to the base station. Generally, the RF circuit 610 includes but is not limited to an antenna, at least one amplifier, a transceiver, a coupler, a low noise amplifier (low noise amplifier, LNA), a duplexer, and the like. In addition, the RF circuit 610 may also communicate with a network and other devices through radio communication. Any communications standard or protocol may be used for the radio communication, including but not limited to Global System for Mobile Communications (global system of mobile communication, GSM), General Packet Radio Service (general packet radio service, GPRS), Code Division Multiple Access (code division multiple access, CDMA), Wideband Code Division Multiple Access (wideband code division multiple access, WCDMA), Long Term Evolution (long term evolution, LTE), email, short message service (short messaging service, SMS), and the like.

The memory 620 may be configured to store a software program and a module. The processor 680 executes the software program and the module stored in the memory 1120, to perform the image display methods in the embodiments of this application. The memory 620 may primarily include a program storage area and a data storage area, where the program storage area may store an operating system, an application program required by at least one function (such as a sound playback function or an image playback function), and the like; and the data storage area may store data (such as audio data or a phonebook) created based on use of the terminal, and the like. In addition, the memory 620 may include a high-speed random access memory, and may further include a non-volatile memory such as a disk storage device, a flash memory device, or another volatile solid-state storage device.

The input unit 630 may be configured to receive input digit or character information and generate key signal input related to user setting and function control of the terminal. Specifically, the input unit 630 may include a touch panel 631 and other input devices 632 (for example, a mouse or a keyboard). The touch panel 631 is capable of collecting a touch operation performed by a user on or near the touch panel 631 (for example, an operation performed on the touch panel 631 or near the touch panel 631 by the user by using a finger, a stylus, or any other appropriate object or accessory), and driving a corresponding connection apparatus according to a preset program. Optionally, the touch panel 631 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touchpoint coordinates, and sends the touchpoint coordinates to the processor 680, and can receive a command sent by the processor 680 and execute the command. In addition, the touch panel 631 may be implemented in a plurality of types, for example, a resistive type, a capacitive type, an infrared type, and a surface acoustic wave type. In addition to the touch panel 631, the input unit 630 may further include the other input devices 632. Specifically, the other input devices 632 may include but are not limited to one or more of a physical keyboard, a function key (such as a volume control key or a switch key), a trackball, a mouse, and a joystick.

The display unit 640 may be configured to display information entered by the user, information provided to the user, and various menus of the terminal. The display unit 640 may include the display panel 641. Optionally, the display panel 641 may be configured in a form of a liquid crystal display (liquid crystal display, LCD), an organic light-emitting diode (organic light-emitting diode, OLED), or the like. Further, the touch panel 631 may cover the display panel 641. After detecting a touch operation on or near the touch panel 631, the touch panel 631 sends the touch operation to the processor 680 to determine a type of a touch event. Then the processor 680 provides corresponding visual output on the display panel 641 based on the type of the touch event. Although the touch panel 631 and the display panel 641 in FIG. 6 are used as two independent parts to implement input and input functions of the terminal, in some embodiments, the touch panel 631 and the display panel 641 may be integrated to implement the input and output functions of the terminal.

The terminal may further include at least one sensor 650 such as a light sensor, a motion sensor, and another sensor. Specifically, the light sensor may include an ambient light sensor and a proximity sensor. The ambient light sensor may adjust luminance of the display panel 641 based on brightness of ambient light, and the proximity sensor may turn off the display panel 641 and/or backlight when the terminal moves to an ear. As a type of motion sensor, an accelerometer sensor can detect a value of an acceleration in each direction (usually, there are three axes), can detect a value and a direction of gravity when the terminal is static, and can be used for identifying a terminal posture (for example, switch between landscape and portrait screens, a related game, and magnetometer posture calibration), a vibration-recognition related function (such as a pedometer and a tap), and the like. The terminal may be further provided with a gyroscope, a barometer, a hygrometer, a thermometer, an infrared sensor, and other sensors, and details are not described herein.

The audio circuit 660, a loudspeaker 661, and a microphone 662 may provide an audio interface between the user and the terminal. The audio circuit 660 may transmit, to the loudspeaker 661, an electrical signal that is obtained after conversion of received audio data, and the loudspeaker 661 converts the electrical signal into an acoustic signal and outputs the acoustic signal. In addition, the microphone 662 converts a collected an acoustic signal into an electrical signal, the audio circuit 660 receives and converts the electrical signal into audio data, and outputs the audio data to the processor 680 for processing, and then processed audio data is sent to, for example, another terminal, by using the RF circuit 610, or the audio data is output to the memory 620 for further processing.

Wi-Fi is a short-range wireless transmission technology, and the terminal may help, by using the Wi-Fi module 670, the user to, for example, send and receive an e-mail, browse a web page, or access streaming media. The Wi-Fi module 670 provides wireless broadband Internet access for the user. Although FIG. 6 shows the Wi-Fi module 670, it can be understood that the Wi-Fi module 670 is not a necessary constituent of the terminal and may be omitted as required provided that the essence of the present invention is not changed.

The processor 680 is a control center of the terminal, and is configured to: connect various parts of the entire terminal by using various interfaces and lines, run or execute software programs and/or modules stored in the memory 620 and invoke data stored in the memory 620, to perform the image display method in this embodiment of this application. Optionally, the processor 680 may include one or more processing units. Preferably, an application processor and a modem processor may be integrated in the processor 680, where the application processor primarily processes an operating system, a user interface, an application program, and the like, and the modem processor primarily processes radio communication. It can be understood that the modem processor may also be not integrated in the processor 680.

The terminal further includes the power supply 690 (for example, a battery) that supplies power to the components. Optionally, the power supply may be logically connected to the processor 680 by using a power supply management system. In this way, functions such as management of charging, discharging, and power consumption are implemented by using the power supply management system.

Although not shown, the terminal may further include a camera, a Bluetooth module, and the like, and details are not described herein.

In this embodiment of this application, the processor 680 included in the terminal has the following functions:

recognizing text information in a target picture; extracting first key information of the text information, where the first key information includes a text keyword set and word frequency corresponding to each text keyword; obtaining a voice file corresponding to the text information; and if the word frequency corresponding to the text keyword is greater than a threshold, mapping the voice file to a first preset coordinate position in the target picture.

Optionally, the processor 680 included in the terminal further has the following functions:

if the word frequency corresponding to the text keyword is not greater than the threshold, extracting and saving second key information of the voice file, where the second key information includes a voice keyword set and a voice segment corresponding to each voice keyword; and if a first voice keyword matching the text keyword exists in the voice keyword set, mapping, to a coordinate position of the text keyword in the target picture, a first voice segment corresponding to the first voice keyword.

Optionally, the processor 680 included in the terminal further has the following functions:

if a keyword matching a second voice keyword does not exist in the text keyword set, mapping, to a second preset coordinate position in the target picture, a second voice segment corresponding to the second voice keyword, where the second voice keyword is included in the voice keyword set.

Optionally, the processor 680 included in the terminal may specifically execute the following functions:

calibrating the target picture, and recognizing the target picture to obtain the text information.

Optionally, the processor 680 included in the terminal further has the following functions:

generating and saving the target picture, where the target picture displays a play button, and the play button is used to play back the voice file.

Optionally, the touch panel 631 included in the terminal further has the following functions:

receiving a click operation on the play button for the processor 680 to play back the voice file.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An electronic device comprising:
a memory configured to store instructions; and
a processor coupled to the memory and configured to execute the instructions, which causes the electronic device to:
photograph a document to obtain a first picture, wherein the document comprises a first text keyword and a second text keyword;
record audio to obtain a voice file corresponding to the document;
obtain, from the voice file, a first voice segment matching the first text keyword and a second voice segment matching the second text keyword;
display a second picture;
obtain a first coordinate position of the first text keyword in the second picture;
obtain a second coordinate position of the second text keyword in the second picture,
wherein a first play button is displayed corresponding to the first coordinate position of the first text keyword, and
wherein a second play button is displayed with corresponding to the second coordinate position of the second text keyword;
detect a first user input on the first play button;

play, in response to the first user input, the first voice segment;
detect a second user input on the second play button; and
play, in response to the second user input, the second voice segment.

2. The electronic device of claim 1, wherein the instructions further cause the electronic device to:
recognize text information in the first picture; and
extract first key information of the text information, wherein the first key information comprises a text keyword set and word frequency corresponding to each text keyword, and wherein the word frequency is a quantity of occurrence times of each text keyword in the document.

3. The electronic device of claim 2, wherein the instructions further cause the electronic device to:
map the first voice segment to the first text keyword when the word frequency of the first text keyword is greater than a threshold; and
map the second voice segment to the second text keyword when the word frequency of the second text keyword is greater than the threshold.

4. The electronic device of claim 2, wherein the voice file comprises a voice keyword set and a voice segment corresponding to each voice keyword in the voice keyword set.

5. The electronic device of claim 2, wherein the instructions further cause the electronic device to extract first key information based on preset feature information or a character recognition manner.

6. The electronic device of claim 1, wherein the instructions further cause the electronic device to:
calibrate the first picture; and
recognize the first picture to obtain text information.

7. A computer program product comprising computer-executable instructions stored on a non-transitory computer readable medium that, when executed by a processor, cause an apparatus to:
photograph a document to obtain a first picture, wherein the document comprises a first text keyword and a second text keyword;
record audio to obtain a voice file corresponding to the document;
obtain, from the voice file, a first voice segment matching the first text keyword and a second voice segment matching the second text keyword;
display a second picture;
obtain a first coordinate position of the first text keyword in the second picture;
obtain a second coordinate position of the second text keyword in the second picture,
wherein a first play button is displayed with corresponding to the first coordinate position of the first text keyword, and
wherein a second play button is displayed corresponding to the second coordinate position of the second text keyword;
detect a first user input on the first play button;
play, in response to the first user input, the first voice segment;
detect a second user input on the second play button; and
play, in response to the second user input, the second voice segment.

8. The computer program product of claim 7, wherein the instructions further cause the apparatus to:
recognize text information in the first picture; and
extract first key information of the text information, wherein the first key information comprises a text keyword set and word frequency corresponding to each text keyword, and
wherein the word frequency is a quantity of occurrence times of each text keyword in the document.

9. The computer program product of claim 8, wherein the instructions further cause the apparatus to:
map the first voice segment to the first text keyword when the word frequency of the first text keyword is greater than a threshold; and
map the second voice segment to the second text keyword when the word frequency of the second text keyword is greater than the threshold.

10. The computer program product of claim 8, wherein the voice file comprises a voice keyword set and a voice segment corresponding to each voice keyword in the voice keyword set.

11. The computer program product of claim 8, wherein the instructions further cause the apparatus to extract first key information based on preset feature information or a character recognition manner.

12. The computer program product of claim 7, wherein the instructions further cause the apparatus to:
calibrate the first picture; and
recognize the first picture to obtain text information.

13. An image and voice processing method comprising:
photographing a document to obtain a first picture, wherein the document comprises a first text keyword and a second text keyword;
recording audio to obtain a voice file corresponding to the document;
obtaining, from the voice file, a first voice segment matching the first text keyword and a second voice segment matching the second text keyword;
displaying a second picture;
obtaining a first coordinate position of the first text keyword in the second picture;
obtaining a second coordinate position of the second text keyword in the second picture,
wherein a first play button is displayed corresponding to the first coordinate position of the first text keyword, and
wherein a second play button is displayed corresponding to the second coordinate position of the second text keyword;
detecting a first user input on the first play button;
playing, in response to the first user input, the first voice segment;
detecting a second user input on the second play button; and
playing, in response to the second user input, the second voice segment.

14. The image and voice processing method of claim 13, further comprising:
recognizing text information in the first picture; and
extracting first key information of the text information, wherein the first key information comprises a text keyword set and word frequency corresponding to each text keyword, and wherein the word frequency is a quantity of occurrence times of each text keyword in the document.

15. The image and voice processing method of claim 14, further comprising:
mapping the first voice segment to the first text keyword when the word frequency of the first text keyword is greater than a threshold; and mapping the second voice segment to the second text keyword when the word frequency of the second text keyword is greater than the threshold.

16. The image and voice processing method of claim 14, wherein the voice file comprises a voice keyword set and a voice segment corresponding to each voice keyword.

17. The image and voice processing method of claim 14, wherein the text information comprises a text feature.

18. The image and voice processing method of claim 14, further comprising extracting first key information based on preset feature information in a database.

19. The image and voice processing method of claim 14, further comprising extracting first key information based on a character recognition manner.

20. The image and voice processing method of claim 13, further comprising:
 calibrating the first picture; and
 recognizing the first picture to obtain text information.

* * * * *